Patented Mar. 16, 1937

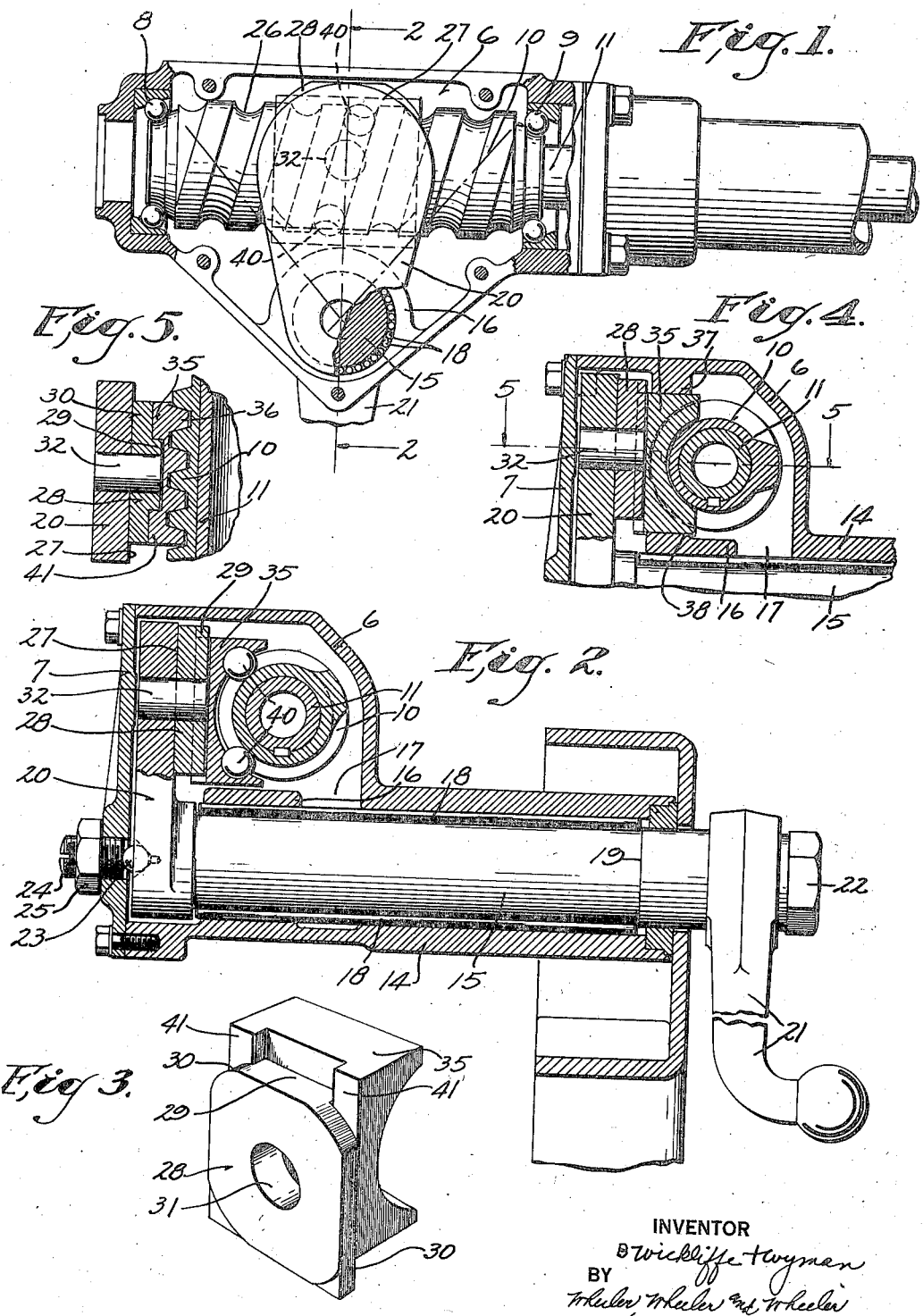

2,073,717

UNITED STATES PATENT OFFICE 2,073,717

STEERING GEAR

B. Wickliffe Twyman, Milwaukee, Wis., assignor to Lavine Gear Company, Milwaukee, Wis., a corporation of Wisconsin Application March 24, 1934, Serial No. 717,177

11 Claims. (Cl. 74—499)

This invention relates to improvements in steering gears.

Broadly stated, it is the object of the present invention to provide a new and highly improved steering gear having less friction loss than any other gear and adapted for economical manufacture.

More specifically stated, it is my object to produce a constant ratio steering gear using a standard thread on the worm cam, with which the cam follower or nut meshes uniformly at all times. In order that the gear may have a constant ratio it is essential that the point of application of power to the rocker arm shall traverse an arc. In order that a standard thread and uniform degree of mesh may be used, it is necessary that the cam follower or nut shall travel rectilinearly along the worm cam. For compactness, economy of manufacture, and efficient motion transmission, without substantial friction losses, it is desirable that the cam follower be interposed between the worm cam and the rocker arm to which motion is transmitted. All of these apparently inconsistent requirements have been harmonized in the present gear.

It is another very important object of the invention to provide a steering gear which will be self-correcting but from which "wheel fight" will be eliminated. These important objectives also are obtained in the gear hereinafter to be disclosed.

In the drawing:

Figure 1 is a view of a steering gear mechanism with the cover of the casing removed and adjacent casing portions shown in section to expose the gear structure.

Figure 2 is a view taken in section in the plane indicated at 2—2 in Fig. 1.

Figure 3 is an enlarged detail view in perspective of the slide mechanism through which motion is transmitted from the worm cam to the rocker arm.

Figure 4 is a fragmentary detail view similar to Figure 2 showing a modified construction.

Figure 5 is a view taken in section and in fragmentary detail on the line indicated at 5—5 in Figure 4.

Like parts are identified by the same reference characters throughout the several views.

The casing 6 has a removable cover at 7 and is provided with suitable bearings at 8 and 9 for the worm cam 10 to which the steering shaft 11 is connected.

A sleeve-like extension 14 from the side of the gear casing provides a bearing for the rock shaft 15. Another bearing is provided wholly within the casing by a collar-like member 16 which is integral with the casing but completely housed therein. The space 17 gives the grease within the gear casing free access to the rock shaft bearings. Anti-friction rollers 18 of extremely small diameter preferably extend throughout the length of the bearing portion of the rock shaft 15, which is slightly reduced in diameter so as to confine these rollers against axial displacement by a shoulder at 19. The rollers are prevented from moving in the opposite direction by means of the rocker arm 20.

One end of the rock shaft 15 rigidly carries the ball arm 21 which is demountably secured thereto by a nut 22. At the other end the shaft 15 (or rocker arm 20, which is preferably forged in one piece thereon) is engaged adjustably by a thrust ball 23 seating against a plug 24 screw-threaded to cover 7 and held in adjustment by a lock nut 25.

The worm cam 10 differs from the worm cams of most gears in general use in the fact that its thread 26 is of uniform pitch and depth. So simple a thread is used that it can readily be cut on an ordinary bolt machine. In practice the thread is preferably cut to the exact size of the balls which are to mesh therewith and then is burnished to afford proper clearance by an operation in which the piece of shafting, screw threaded in sufficient length to comprise material for several worm cams, is driven axially through a guide beyond which the thread is engaged in turn by a series of balls which are successively held at gradually decreasing radii from the axis of the gear. This operation is to comprise the subject matter of a separate application for patent and consequently is not claimed herein.

It will be noted that the shape of the rocker arm 20 as shown in Figure 1 comprises an elongated oval providing at 27 a very broad bearing surface with which the slide block 28 is engaged. This block has a slide portion 29 (Fig. 3) and side flanges 30. In its center the block has a cylindrical opening 31 which preferably extends clear through the block to receive a bearing pin 32 fixed in the rocker arm 20.

A cam follower or nut sector 35 may have conventional threads meshing with the worm cam, as shown in Figs. 4 and 5 at 36. It may also be confined for movement along the axis of the worm cam by means of guides 37 and 38 having machines surfaces and formed integrally with the casing as shown in Fig. 4. Preferably, however, and particularly for all steering gears used in passenger car service, as distinguished from heavy busses or trucks, the guides are omitted and the threaded connection of the cam follower or nut 35 with the worm cam is established by means of balls such as are shown at 40 in Figs. 1 and 2, such balls being seated in suitable recesses in the cam follower 35 as shown in Fig. 2.

The cam follower has spaced rails at 41 which engage the under surfaces of flanges 30 of the slide block and also engage the side surfaces of the block element 29. The inner face of block 29 is not in contact with the cam follower 35, and neither is the post 32, but the cam follower 35 is sufficiently reinforced by the rails 41 so that it can be made very thin at its center, thereby bringing the end of post 32 very close indeed to the teeth of worm cam 10 and to the pitch circle of such teeth at which the thrust thereof is developed.

The balls 40 are so spaced that the radial thrust of the worm cam thereon is resolved upon a radius midway between the balls and at right angles to the bearing surfaces between the rocker arm 20 and the slide block 28. In the intermediate position of the parts as shown in Figs. 1 and 2 the axis of pivot post 32 will be slightly above the plane defined by the axis of the worm cam and the radius aforesaid. If the gear is operated, however, to turn arm 20 and rock shaft 15 to one or the other of the extreme positions represented by the center lines shown in broken lines in Fig. 1, the pivot post will intersect the plane above described and terminate its motion with its axis somewhat below said plane.

Due to the fact that the radial distance from the axis of rock shaft 15 to the axis of the stud or post 32 has a constant value the gear has a constant ratio. Yet the nut sector on the cam follower 35 has rectilinear movement along the axis of the worm cam and maintains a constant degree of mesh with a uniform standard thread. Because the outward thrust of the cam follower 35 is always parallel to and never far distant from the axis of the stud or post 32, the cost of the materials for the gear is tremendously reduced, friction is minimized, and adjustment is entirely controlled by the single screw threaded plug at 24. This plug, acting through the single ball at 23, alone receives the entire thrust tending to separate the cam follower 35 from the worm cam 10, and is therefore wholly responsible for the adjustment of the parts.

Experience with the gear indicates that there is exceptionally little wear occasioned in its use. When such wear does occur or when any change of adjustment is desired, it may be compensated by an adjustment of the entire rock shaft 15 in an axial direction, thereby moving arm 20 closer to or farther from the axis of the worm cam, parallel to which it oscillates in the normal operation of the gear.

A gear made in accordance with the present invention has surprisingly little friction as compared with conventional gears. A series of the devices herein disclosed have been tested and found to be from 84 to 91 per cent efficient in the transmission of motion. It is likewise important to note that because uniform mesh is preserved between the cam follower and a thread of uniform pitch and depth, there is substantially no change in friction in this gear throughout the range of its operation.

Because the present gear is a constant ratio gear in which the axis of the post 32 follows an arcuate path instead of moving rectilinearly along the worm cam with the cam follower 35, a given angular range of rock shaft movement may be effected with a minimum length and height of gear casing. Comparison with structures previously made shows that a saving of about thirty per cent of rate of material is effected. The gear is therefore light, economically made, and exceptionally compact for its power and range.

The gear is so frictionless that it is easily self-correcting and the camber of the dirigible wheels of a vehicle controlled by this gear tend to straighten the wheels after they have been turned for a corner. Most self-correcting steering gears are responsible for a great deal of "wheel fight", this being the expression used by the trade to refer to a road shock transmitted through the steering gear to the steering wheel. For some reason "wheel fight" seems to be very largely absent from the present gear, notwithstanding its self-correcting qualities and lack of friction. It is believed that the absence of "wheel fight" is probably attributable to the slide arrangement best shown in Figs. 2 and 3.

It will be observed that any motion originating in the wheels and tending to oscillate the rock shaft 15 will be resolved into two components of direction in the slide mechanism, one of which is along the axis of the worm cam and the other of which is at right angles thereto in block 29. If the reverse operation of the gear be occasioned by a sudden shock it appears probable that the resolution of the motion into two components at right angles to each other as above described, is accompanied by a considerable friction in excess of that found in the normal functioning of the parts, so that the shock is dissipated in friction without being transmitted to the worm cam and thence to the steering wheel. In any event the gear is notably free from "wheel fight", particularly in comparison with its extremely low friction.

I claim:

1. In a steering gear, the combination with a worm cam and a rock shaft, of an arm on said rock shaft movable parallel to the axis of said worm cam, a post projecting from said arm toward said worm cam and arcuately movable, a slide block pivoted on said post and having its face in sliding bearing contact against said arm, and a cam follower with respect to which said block is slidable meshing with said worm cam, said block and follower being interposed in bearing pressure transmitting relation between said worm cam and arm, whereby to transmit to said arm the radial thrust of said cam on said follower.

2. A steering gear comprising the combination with a worm cam having a thread of substantially uniform pitch and depth, of a rock shaft having an arm laterally adjacent said cam and faced to provide a bearing surface opposed to said cam, and means including a part meshing with said cam and lying wholly between its axis and said surface, and a coacting part bearing on said surface and pivoted for movement about a fixed point on said surface for transmitting motion from said worm cam and said first mentioned part to said rock shaft.

3. In a steering gear, the combination with a worm cam having a thread of substantially constant pitch and depth, of a rock shaft provided with an arm laterally adjacent said cam, a stud projecting from said arm toward said cam and fixed in said arm, a bearing member fulcrumed on said stud and bearing against said arm, a cam follower bearing on said member and interposed substantially symmetrically between said member and worm cam in pressure transmitting relation to said arm, and means providing a sliding connection between said bearing member and cam follower whereby said cam follower is movable axially of said worm cam in mesh with the thread thereof.

4. In a steering gear, the combination with a worm cam having a thread of substantially uniform pitch and depth, of a cam follower wholly at one side of the axis of said cam and arcuately hollowed to fit said cam and provided with means meshing with the threads thereof, rails reinforcing said cam follower tangentially of its arcuately hollowed portion and providing a guideway with opposed parallel faces, a bearing block having a portion slidable between said rails and complementary to said faces, and a rock shaft provided with an arm against which said block bears, said arm having a post extending through said block between said rails into close proximity to the worm cam, and said follower being dependent on said rock shaft for its position of mesh with said cam.

5. In a device of the character described, the combination with a steering gear casing, of a worm cam and rock shaft provided with bearings for rotation upon offset axes at right angles to each other, a rocker arm connected with said rock shaft and provided with a bearing surface laterally adjacent said worm cam, a post projecting from said surface toward said worm cam and fixed in said arm, a bearing block engaging said bearing surface and apertured to receive said post, said block having bearing flanges and side wall portions, a cam follower meshing with said cam and provided with spaced rails engaging said flanges and side wall portions, and a thrust bearing for said rock shaft adjustable with respect to said casing and comprising means for fixing the relative positions of said arm and worm cam and the bearing block and cam follower interposed therebetween.

6. In a device of the character described, the combination with a gear casing and a worm cam, a rock shaft provided with bearings offset and at right angles to each other, said worm cam having a thread of substantially uniform pitch and depth, of a cam follower wholly at one side of the axis of said worm cam and provided with balls meshing with the thread of said cam and movable longitudinally thereof in a plane including the axis of said cam and parallel to the axis of said shaft, an arm connected with said shaft and provided with a bearing surface normal to said plane and a pivot means fixed at a radial distance from said shaft such as to intersect said plane in the oscillatory movement of said arm and shaft, and means providing a motion transmitting connection interposed in thrust-transmitting relation between said cam follower and said bearing surface and in pivotal connection with said pivot means of said arm, said connection means having a portion pivotal with respect to said bearing and another portion slidable with respect to said cam follower, transversely of said cam.

7. In a device of the character described, the combination with a gear casing and a worm cam, a rock shaft provided with bearings offset and at right angles to each other, said worm cam having a thread of substantially uniform pitch and depth, of a cam follower wholly at one side of the axis of said worm cam and provided with balls meshing with the thread of said cam and movable longitudinally thereof in a plane including the axis of said cam and parallel to the axis of said shaft, an arm mounted on said shaft and having a bearing face presented toward said cam and a bearing stud projecting from said face at a radial distance from said shaft such as to intersect said plane in the oscillation of said arm, means fixing said rock shaft against displacement, whereby said arm is adapted to receive the thrust of said cam follower radially of said worm cam, and a slide block fulcrumed upon said post and bearing against the said face of said arm and provided with thrust and sliding bearing connections with said cam follower.

8. In a device of the character described, the combination with a gear casing and a worm cam, a rock shaft provided with bearings offset and at right angles to each other, said worm cam having a thread of substantially uniform pitch and depth, of a cam follower provided with balls meshing with the thread of said cam and movable longitudinally thereof in a plane including the axis of said cam and parallel to the axis of said shaft, an arm mounted on said shaft and having a bearing face presented toward said cam and a bearing stud projecting from said face at a radial distance from said shaft such as to intersect said plane in the oscillation of said arm, and a slide block fulcrumed upon said post and bearing against the said face of said arm and provided with thrust and sliding bearing connections with said cam follower, said gear casing having a removable cover portion beyond said arm provided with an adjustable thrust bearing engaging said shaft, and said cam follower being wholly dependent upon said thrust bearing for its mesh with said worm cam.

9. In a device of the character described, the combination with a screw threaded worm cam and a rock shaft provided with bearings offset and substantially at right angles to each other, of an arm connected with the rock shaft and oscillatable in a plane parallel to the axis of worm cam, said rocker arm having a bearing surface substantially parallel to its plane of oscillation and opposed to said worm cam, a fulcrum pin projecting from said surface toward said worm cam, a thrust bearing acting upon said rock shaft in a direction to limit the separation between said bearing surface and worm cam, and motion transmitting means confined between said bearing surface and worm cam and providing a connection between said worm cam and arm for the oscillation of said shaft, said means being held to said worm cam by said thrust bearing and by contact with the bearing surface of said arm and comprising a concave cam follower fitted about said worm cam and having balls meshing with the threads thereof and also having tangential rails with opposed parallel surfaces and a slide block pivoted upon said fulcrum pin and closely fitted between the opposed surfaces of said rail.

10. A steering gear comprising the combination with a worm cam having a uniform thread, of a rock shaft disposed in a position offset and substantially at right angles to said worm cam, a casing providing bearings for said worm cam and rock shaft, a rocker arm carried by said rock shaft and having a bearing surface movable in a plane parallel to and laterally spaced from said worm cam and means for transmitting motion from said worm cam to said rock shaft, said means being interposed between said bearing surface and worm cam and comprising parts in pivotal and slidable connection, one of said parts being a nut sector having a concave surface embracing said worm cam wholly at one side of the axis thereof and substantially symmetrical with reference to a line from said axis directly to the arm of the rock shaft, said nut sector having on opposite sides of said line recesses and balls therein meshing with the thread of said worm cam to receive motion therefrom.

11. As a part of a steering gear, a nut sector comprising a block with a concave face of less than one hundred and eighty degrees extent provided substantially symmetrically at opposite sides of its center with recesses and balls partially socketed therein to project from said face as threads, together with means at the outside of the block providing a bearing surface approximately tangent to the concave face of said block and reinforcing rails bounding said bearing surface and having opposed inner bearing surfaces, said rails constituting a means for rigidly joining the opposite end portions of the block across the thin section where the outer bearing surface of the block approaches the inner concave surface thereof.

B. WICKLIFFE TWYMAN.